June 7, 1932.  C. J. WEISS  1,862,104
ANTISKID TIRE CHAIN
Filed Nov. 6, 1930
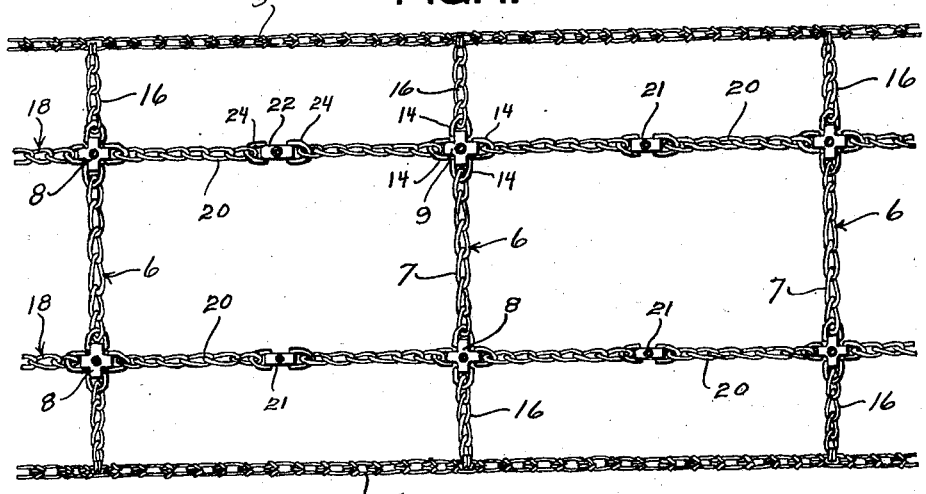
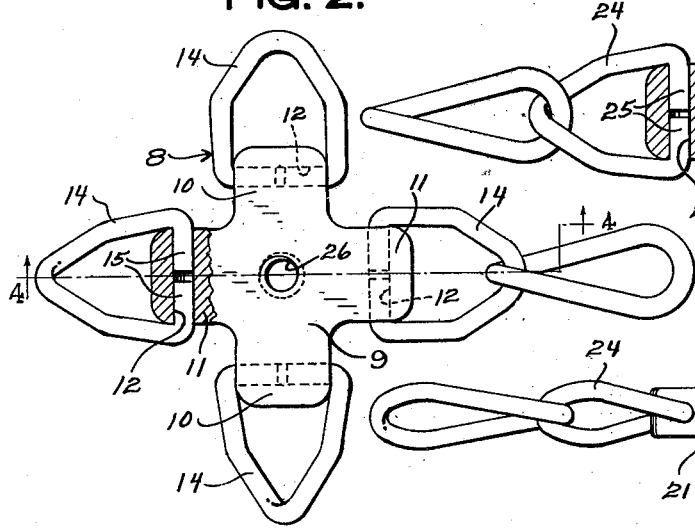
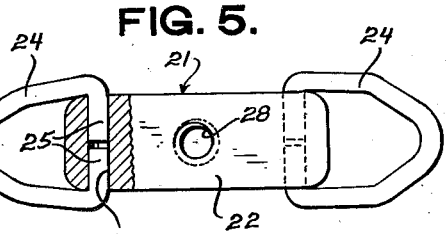
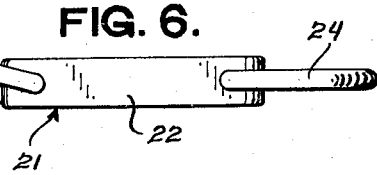
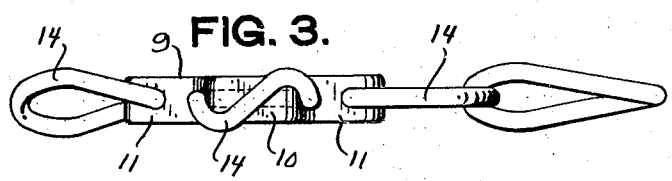
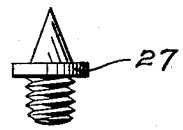
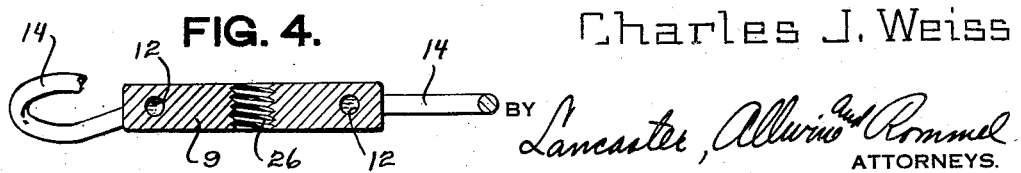
INVENTOR.
Charles J. Weiss
BY
Lancaster, Allwine and Rommel
ATTORNEYS.

Patented June 7, 1932

1,862,104

UNITED STATES PATENT OFFICE

CHARLES J. WEISS, OF TOWANDA, PENNSYLVANIA

ANTISKID TIRE CHAIN

Application filed November 6, 1930. Serial No. 493,842.

The present invention relates to anti-skid devices for vehicle wheels and the primary object of the invention is to provide an improved anti-skid tire chain primarily intended for use upon tires of motor vehicle wheels to increase traction and prevent skidding upon slippery road surfaces.

A further object of the invention is to provide an improved anti-skid tire chain having increased anti-skidding qualities over the present conventional types of anti-skid chains.

A further object resides in the novel arrangement whereby the chain may be constructed with but little or no additional cost over the present types of anti-skid chains as now in common use.

A further object resides in the specific arrangement whereby the present types of anti-skid chains embodying side and cross chains may have the improved anti-skid means incorporated therein.

A further object resides in the improved construction of the gripping members forming connecting links between the chain sections of the device.

Other objects and advantages of the present invention will be apparent from the following description taken in connection with the accompanying drawing forming a part of this specification and in which drawing:

Figure 1 is a fragmentary plan view of the improved anti-skid tire chain.

Figure 2 is an enlarged plan view of one of the gripping devices for connection in the cross chains; and Figure 3 is a side view thereof.

Figure 4 is a section on line 4—4 of Figure 2.

Figure 5 is a plan view of one of the gripping devices for connection in the circumferential tread chains; and Figure 6 is a side view thereof.

Figure 7 is a side view of one of the calks or spurs for the gripping devices.

Referring to the drawing in detail and wherein similar reference characters designate corresponding parts thruout the several views, the improved anti-skid device comprises a pair of parallel side chains 5 which may be of usual construction and are intended to engage against opposite side walls of the tire. Connecting the side chains 5 at equidistantly spaced points therealong is a series of cross chains 6 which are preferably of the twisted link type as shown. These cross chains 6 extend in a circumferential direction about the tire and are provided intermediate their ends with tread sections 7 adapted to extend in parallel relation transversely across the tread surface of the tire.

Connected in each cross chain 6 at the ends of the tread sections 7 are grippers 8 embodying a solid cross link 9 as clearly shown in Figure 2 and providing four radially extending arms of like formation and having the companion pairs of aligning arms 10—10 and 11—11 arranged in right angular relation. These cross links 10 are substantially flat and the outer end portion of each arm thereof is provided with a round opening 12 extending from edge to edge of the arm. Each of the arms 10—10 and 11—11 has attached thereto a coupling link 14 and these links 14 are of a construction to permit ready and easy renewing of the grippers or the sections of chains connected by the grippers. The coupling links 14 are split as shown and the free ends of the links are formed into axially aligning attaching arms 15 which are inserted into opposite ends of the openings 12 and provide pivotal connections for the links. As shown particularly in Figures 2 and 3, one coupling link of each pair of arms 10—10 and 11—11 is a straight link while the companion coupling link is a twisted link. This arrangement is merely to permit proper connection of the end links of a twisted link chain to the coupling links. The end links of the tread sections 7 are connected in one of the coupling links 14 of the grippers 8 and these tread sections are of a length to dispose the grippers along the edge portions of the tread surface of the tire.

Connected in the coupling links of each companion cross link arm to which the ends of the tread sections 7 are connected, is a short cross chain end section 16, the outer or opposite ends of which are joined by suitable coupling links to the side chains 5. Thus the grippers serve to connect the cross chain sections 7 and 16 in alignment transversely of the tire.

Extending parallel to the side chains 5 is a pair of connecting tread chains 18 each embodying connecting chain sections 20 connected between the grippers 8 so as to extend along the side edges of the tread portion of the tire. These connecting chain sections 20 are preferably formed of twisted links and have the end links thereof connected by the coupling links 14 to the cross links 9 so that the chain sections 20 extend at a right angle to the tread sections 7. Connected in each chain section 20, midway the ends thereof, is a gripper 21 embodying a solid bar link 22 of flat, rectangular shape and provided at each end with round openings 23 extending from edge to edge of the link. A split coupling link 24 is provided for each end of the bar link 22 and these coupling links are provided with axially aligning arms 25 inserted into the opposite ends of the openings 23.

The cross links 9 are provided at their axial center with a tapped opening 26 for threaded reception of a pointed calk or spur 27 as shown in detail in Figure 7; while each of the bar links 22 are provided midway their ends with a tapped opening 28 for also receiving one of the calks or spurs 27. These calks or spurs provide additional gripping means and by reason of their removable connection with the solid links may be readily and quickly renewed when worn.

By observing Figure 1, it will be seen that the grippers 8 and 21 are arranged in spaced rows parallel to the side chains 5 and these rows of grippers are adapted to extend along opposite side portions of the tread surface of a tire when the anti-skid device is applied for use. The connecting tread chains 18 not only serve as means for retaining the cross chains 6 in proper spaced relation but also permit positioning of the additional grippers 21 midway between the grippers 8. It will also be noted from Figure 1 that the arrangement of the grippers 8 and 21 permits use of relatively short lengths of chain thruout with the exception of the side chains 5 which are not subjected to any great amount of wear. Should any one of the sections of twisted link chains become broken, the same may be easily and economically replaced.

From the foregoing it will be apparent that a novel and improved construction for anti-skid tire chains has been provided whereby increased traction and anti-skidding qualities will be had over the conventional types of tire chains. It will also be apparent that an arrangement is provided whereby sections of broken chain may be easily and economically replaced.

Changes in detail may be made to the form of invention herein shown and described, without departing from the spirit of the invention or the scope of the following claims.

I claim:

1. In an anti-skid device, the combination with a pair of side chains, of cross chains connecting the side chains comprising a central tread section, a spurred cross link detachably connected to each end of the tread section, and end chain sections detachably connected at one end of the cross links and at their opposite ends to the side chains; and connecting chain sections detachably connected between the cross links of adjacent cross chains and each having a spurred bar link detachably connected intermediate its ends.

2. In an anti-skid tire chain, the combination with a pair of side chains, of cross chains connecting the side chains comprising a tread chain section, a pair of gripping links having right angular arms, coupling links detachably connecting the gripping links by one arm to the ends of the tread chain section, end chain sections connected to the side chains, and coupling links detachably connecting the end chain sections to an arm of the gripping link in alignment with the tread chain section; and connecting chain sections connecting the other arms of the gripping links and each provided midway of its ends with a gripping link detachably joining the end portions of the connecting chain section.

3. In an anti-skid tire chain, the combination with a pair of side chains, of cross chains connecting the side chains comprising a tread chain section, a pair of cross links having right angular arms apertured at their outer ends, split coupling links connecting the ends of the tread chain section to one arm of the cross links in the apertured end thereof, end chain sections connected at one end to the side chains, and split coupling links connecting the opposite ends of the end chain sections to an arm of the cross link in alignment with the tread chain section; and connecting chains connecting adjacent cross chains and having split coupling links at the ends thereof for connection in apertured arms of the cross link.

4. In an anti-skid tire chain the combination of a cross chain embodying a tread section, a cross link having right angular arms, a gripping projection on the link, a split coupling link connecting one arm of each cross link to the ends of the tread section, an end chain section for connection with side chains, split coupling links connecting one end of the end chains sections to an arm of the cross links in alignment with the tread section, and connecting chains between the cross chains each comprising end chain portions, split coupling links connecting the end chain portions to arms of the cross links, a bar link, and split coupling links connecting the bar link between the end chain portions.

CHARLES J. WEISS.